No. 858,396. PATENTED JULY 2, 1907.
A. ISSLEIB.
LATCH LOCK SPINDLE FASTENING.
APPLICATION FILED FEB. 23, 1907.
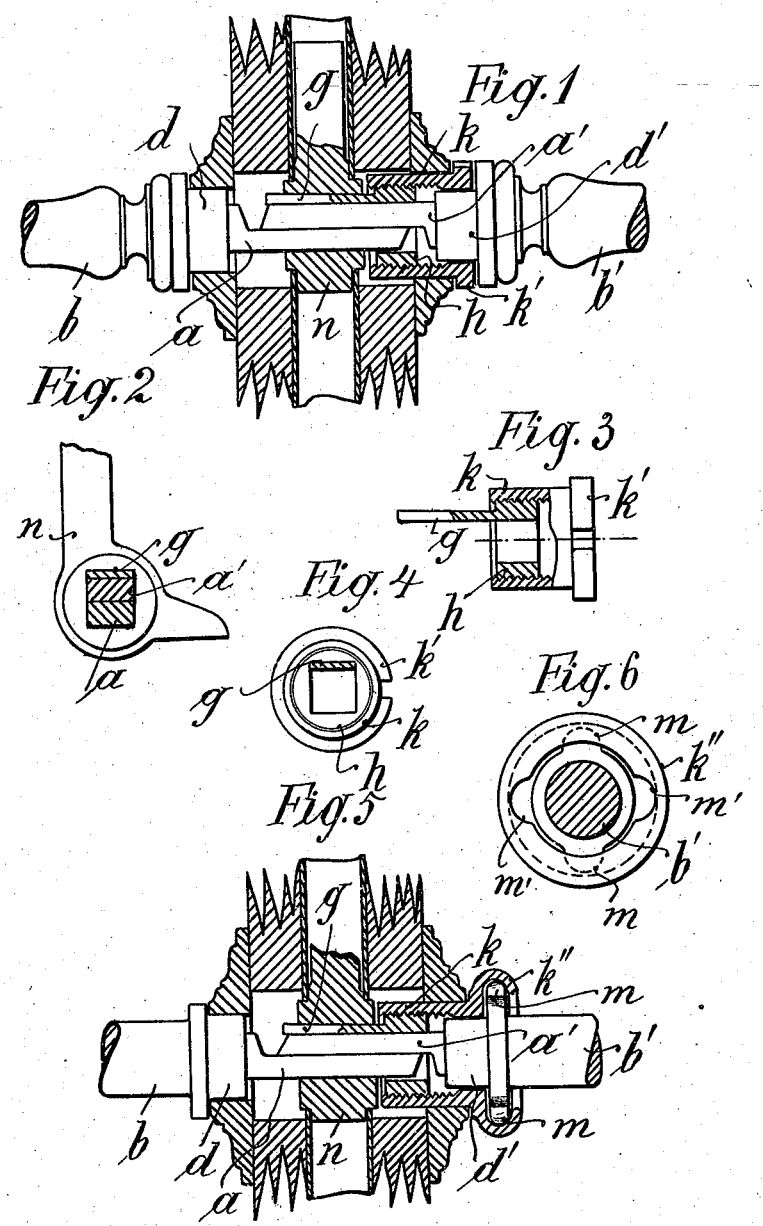
Witnesses.
A. J. Hadden
A. Morris
Inventor
Arthur Issleib
by R. Hadden
Attorney

UNITED STATES PATENT OFFICE.

ARTHUR ISSLEIB, OF LEIPZIG, GERMANY.

LATCH-LOCK-SPINDLE FASTENING.

No. 858,396.         Specification of Letters Patent.         Patented July 2, 1907.

Application filed February 23, 1907. Serial No. 368,943.

*To all whom it may concern:*

Be it known that I, ARTHUR ISSLEIB, a subject of the King of Saxony, residing at Leipzig, Germany, have invented a certain new and useful Latch-Lock-Spindle Fastening, of which the following is a specification.

In connection with latch locks it has been found of advantage to use divided spindles, that is to say to connect the two knobs or handles by two spindle-members fixed to the said handles respectively, these members being placed against each other and made fast in the eye of the follower by which the latch bolt is moved. For fastening divided spindles of this kind it has hitherto been usual to use screws, conical press-pins or wedges inserted into the said eye. The employment of these fastening devices necessitates a special construction of lock, that is to say the follower must be provided with the holding or wedging device and the lock-case must be provided with an aperture for the insertion of a key to operate the binding-screw or wedge.

To allow of applying handles with divided spindles to existing locks, without constructional alteration, the expedient has in one case been adopted of making the spindle-members wedge-shaped so that they can be jammed tight by longitudinal displacement in the eye, a screw-threaded sleeve being placed on the neck or boss of one handle and made to engage a threaded prolongation of the spindle-member of the other handle, so that the said member is pulled into the lock-case by turning the sleeve. With this device, however, the handle carrying the sleeve must be keyed to the follower by means of a projection or spline formed on the spindle.

In the present invention a wedge is used for fastening two parallel faced spindle-members placed against each other in the eye of the bolt operating member, this wedge being inserted in the direction of the axis of the spindle and being moved into fastening position by means of a screw threaded sleeve which engages a screw threaded prolongation of the wedge and guided in the aperture of the guard or the like surrounding the spindle. With this device there is no displacement of the spindle-members and handles during the fastening operation, so that the bosses of the handles may be provided with flanges or similar ornamental roses adapted to directly abut on the guards.

Two forms of construction are shown in the annexed drawing to illustrate the invention, Figure 1 being a longitudinal section of the parts connecting the handles, Fig. 2 a cross-section of the spindle and wedge, Fig. 3 a longitudinal section of the wedge and sleeve and Fig. 4 an end-view thereof; Figs. 5 and 6 are respectively a longitudinal section and cross-section illustrating a construction wherein the screw-threaded sleeve is coupled to one of the handles by means of a kind of bayonet-fastening.

The spindle-members $a$ and $a^1$ are fixed in the usual manner to the handles $b$ and $b^1$ respectively, and the handles are provided with bosses $d$ and $d^1$ respectively. Above the members $a$ and $a^1$, and parallel therewith, is arranged the wedge or key $g$, the tapered end of which carries a screw-threaded prolongation $h$ which may be formed as a screw threaded ring. The wedge $g$ is tightened up by means of the threaded sleeve $k$, which is provided with a collar $k^1$ and is guided by the boss $d^1$ and guard-ring (Fig. 1).

The handles and spindle-members are inserted in the usual manner from both sides, so that the spindle-members enter the eye provided in the follower $n$, and at the same time the wedge $g$ is loosely inserted, the collar $k^1$ of the sleeve $k$ being at this stage in contact with the guard-ring at one side of the door, and the collar formed on the boss of the handle $b$ being in contact with the guard-ring at the other side of the door. The sleeve $k$ is then rotated so that the part $g$ is drawn into the eye and presses together the members $a$ and $a^1$. The rotation of the sleeve for tightening up the wedge causes the collar $k^1$ to be pressed tightly against the adjacent guard-ring, so that when the wedge has been made tight the sleeve must be slightly rotated in the opposite direction, to reduce the friction and allow of turning the handles freely. The sleeve $k$ may be provided with a flange $k^{11}$ overhanging the collar formed on the boss $d^1$. In the construction illustrated in Figs. 5 and 6 the flange $k^{11}$ is made integral with the sleeve $k$, and the handle $b^1$ is provided with a plurality of lugs $m$ adapted to pass through corresponding recesses $m^1$ made in the flange $k^{11}$, so that a bayonet-coupling can be made between the sleeve $k$ and handle $b^1$.

What I claim as my invention and desire to secure by Letters Patent of the United States is:—

In a latch lock the combination with the latch operating follower of a divided spindle having parallel overlapping parts adapted to pass together loosely in the eye of the follower a wedge having a screw threaded annular projection, and a screw threaded sleeve exterior of the lock engaging said projection and adapted on rotation to move the wedge longitudinally of the spindle for the purpose set forth.

In witness whereof I have signed this specification in the presence of two witnesses.

ARTHUR ISSLEIB.

Witnesses:
HERM. SACK,
RUDOLPH FRICKE.